(12) United States Patent
Jain et al.

(10) Patent No.: US 9,348,714 B2
(45) Date of Patent: May 24, 2016

(54) SURVIVAL SITE LOAD BALANCING

(71) Applicant: NetApp Inc., Sunnyvale, CA (US)

(72) Inventors: Abhishek Jain, Santa Clara, CA (US);
Chaitanya Patel, Orange, CA (US);
Deepan Natesan Seeralan, Morrisville, NC (US); Linda Ann Riedle, Cary, NC (US)

(73) Assignee: NetApp Inc., Sunnyvale, CA (US)

( * ) Notice: Subject to any disclaimer, the term of this patent is extended or adjusted under 35 U.S.C. 154(b) by 112 days.

(21) Appl. No.: 14/220,648

(22) Filed: Mar. 20, 2014

(65) Prior Publication Data
US 2015/0269042 A1   Sep. 24, 2015

(51) Int. Cl.
G06F 11/07 (2006.01)
G06F 11/20 (2006.01)
H04L 29/08 (2006.01)
G06F 11/16 (2006.01)

(52) U.S. Cl.
CPC ........ G06F 11/2092 (2013.01); G06F 11/1658 (2013.01); H04L 67/1097 (2013.01)

(58) Field of Classification Search
CPC ........................ G06F 11/2023; G06F 11/2033
USPC .................................. 714/4.11, 6.3
See application file for complete search history.

(56) References Cited

U.S. PATENT DOCUMENTS

| | | | | |
|---|---|---|---|---|
| 7,111,194 B1 | 9/2006 | Schoenthal et al. | | |
| 2003/0188233 A1* | 10/2003 | Lubbers | ............. | G06F 11/2069 714/100 |
| 2007/0245110 A1* | 10/2007 | Shibayama | ........... | G06F 3/0605 711/165 |
| 2008/0301332 A1* | 12/2008 | Butler | ................. | H04L 41/0806 710/38 |
| 2011/0252213 A1* | 10/2011 | Shibayama | ........... | G06F 3/0605 711/165 |
| 2012/0079224 A1* | 3/2012 | Clayton | .............. | G06F 11/1456 711/162 |
| 2013/0198562 A1* | 8/2013 | Anthonisamy | ..... | G06F 11/2005 714/6.21 |
| 2013/0275678 A1* | 10/2013 | Matsui | .................. | G06F 3/0608 711/117 |
| 2014/0189277 A1* | 7/2014 | Taki | ...................... | G06F 13/161 711/167 |

* cited by examiner

Primary Examiner — Chae Ko
(74) Attorney, Agent, or Firm — Cooper Legal Group, LLC

(57) ABSTRACT

One or more techniques and/or systems are provided for load balancing between storage controllers. For example, a first storage controller and a second storage controller may be configured at a first storage site according to a high availability configuration, and may be configured as disaster recovery partners for a third storage controller and a fourth storage controller at a second storage site. If the first storage controller fails, the second storage controller provides failover operation for a first storage device. If a disaster occurs at the second storage site, the second storage controller provides switchover operation for a third storage device and a fourth storage device. Responsive to the first storage controller being restored, the third storage device may be reassigned from the second storage controller to the first storage controller for load balancing at the first storage site during disaster recovery of the second storage site.

20 Claims, 9 Drawing Sheets

SURVIVAL SITE LOAD BALANCING

BACKGROUND

A network storage environment may comprise one or more storage controllers configured to provide client devices with access to data stored on storage devices accessible from the respective storage controllers.

DETAILED DESCRIPTION

Figure 1:
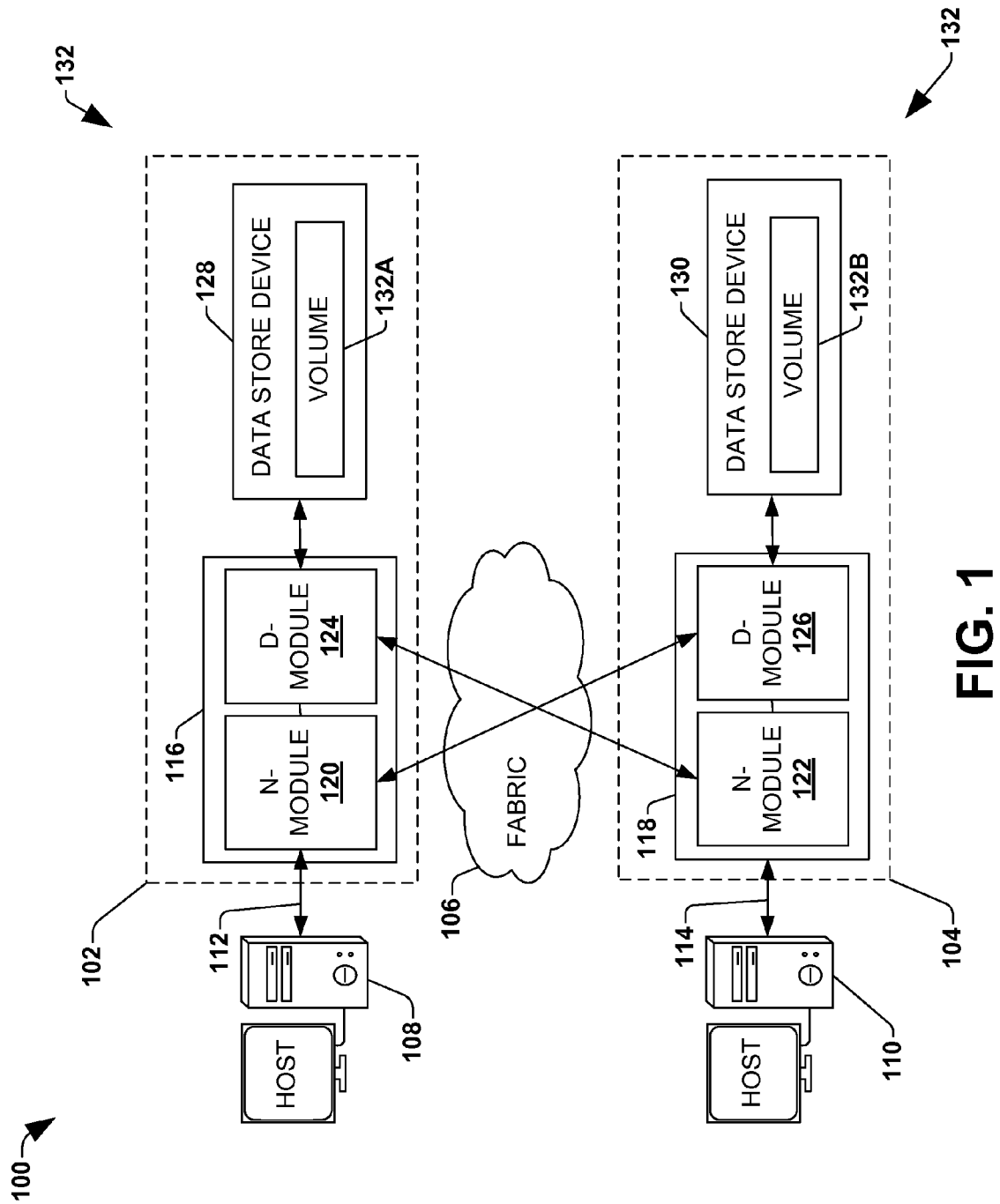
FIG. 1 is a component block diagram illustrating an example clustered network in accordance with one or more of the provisions set forth herein.

Some examples of the claimed subject matter are now described with reference to the drawings, where like reference numerals are generally used to refer to like elements throughout. In the following description, for purposes of explanation, numerous specific details are set forth in order to provide an understanding of the claimed subject matter. It may be evident, however, that the claimed subject matter may be practiced without these specific details. Nothing in this detailed description is admitted as prior art.

One or more systems and/or techniques for load balancing between storage controllers are provided. Within a network storage environment, a first storage controller and a second storage controller are located at a first storage site (e.g., a first location such as a first city). The first storage controller and the second storage controller are configured according to a high availability configuration where the first storage controller provides failover operation for the second storage controller (e.g., the first storage controller provides failover data access to a second storage device managed by the second storage controller in the event the second storage controller fails), and the second storage controller provides failover operation for the first storage controller (e.g., the second storage controller provides failover data access to a first storage device managed by the first storage controller in the event the first storage controller fails).

A third storage controller and a fourth storage controller are located at a second storage site (e.g., a second location such as a second city). The third storage controller and the fourth storage controller are configured according to a high availability configuration where the third storage controller provides failover operation for the fourth storage controller (e.g., the third storage controller provides failover data access to a fourth storage device managed by fourth storage controller in the event the fourth storage controller fails), and the fourth storage controller provides failover operation for the third storage controller (e.g., the fourth storage controller provides failover data access to a third storage device managed by the third storage controller in the event the third storage controller fails).

The first storage controller and the third storage controller are configured according to a disaster recovery configuration where the first storage controller provides switchover operation for the third storage device in the event the second storage site has a disaster (e.g., the first storage controller provides switchover access to the third storage device because the third storage controller may be unavailable due to the disaster), and the third storage controller provides switchover operation for the first storage device in the event the first storage site has a disaster (e.g., the third storage controller provides switchover access to the first storage device because the first storage controller may be unavailable due to the disaster). The second storage controller and the fourth storage controller are configured according to a disaster recovery configuration where the second storage controller provides switchover operation for the fourth storage device in the event the second storage site has a disaster (e.g., the second storage controller provides switchover access to the fourth storage device because the fourth storage controller may be unavailable due to the disaster), and the fourth storage controller provides switchover operation for the second storage device in the event the first storage site has a disaster (e.g., the fourth storage controller provides switchover access to the second storage device because the second storage controller may be unavailable due to the disaster).

As provided herein, automated load balancing may be performed on a surviving site during disaster recovery (e.g., the first storage site may be a surviving site that provides switchover operation in the event the second storage site has a disaster). For example, the first storage controller may have a failure. The second storage controller may provide failover operation for the first storage controller based upon the high availability configuration between the first storage controller and the second storage controller, such that the second storage controller provides failover data access to the first storage device and the second storage device. Responsive to a disaster occurring at the second storage site, the second storage controller may provide switchover operation for the third storage controller (e.g., based upon the first storage controller being unavailable, as a disaster recovery partner, to switchover for the third storage controller) and the fourth storage controller (e.g., based upon the disaster recovery configuration between the second storage controller and the fourth storage controller specifying that the second storage controller is a disaster recovery partner for the fourth storage controller), such that the second storage controller provides data access to the first storage device, the second storage device, the third storage device, and the fourth storage device.

To provide efficient load balancing for the first storage site, the first storage controller is specified as an original storage site owner for the third storage device notwithstanding the first storage controller being in the failed state. When the first storage controller is restored, the third storage device is reassigned from the second storage controller to the first storage controller (e.g., the first storage controller may automatically determine that the third storage device comprises an original storage site owner property that is set to the first storage controller due to the disaster recovery configuration between the first storage controller and the third storage controller). The first storage device is reassigned from the second storage controller to the first storage controller based upon the first storage controller being an original owner of the first storage device. Thus, the first storage controller provides data access to the first storage device and the third storage device, and the second storage controller provides data access to the second storage device and the fourth storage device. In this way, load balancing is automatically performed at the survival site.

To provide context for load balancing between storage controllers, FIG. 1 illustrates an embodiment of a clustered network environment 100. It may be appreciated, however, that the techniques, etc. described herein may be implemented within the clustered network environment 100, a non-cluster network environment, and/or a variety of other computing environments, such as a desktop computing environment. That is, the instant disclosure, including the scope of the appended claims, is not meant to be limited to the examples provided herein. It will be appreciated that where the same or similar components, elements, features, items, modules, etc. are illustrated in later figures but were previously discussed with regard to prior figures, that a similar (e.g., redundant) discussion of the same may be omitted when describing the subsequent figures (e.g., for purposes of simplicity and ease of understanding).

FIG. 1 is a block diagram illustrating an example clustered network environment 100 that may implement at least some embodiments of the techniques and/or systems described herein. The example environment 100 comprises data storage systems or storage sites 102 and 104 that are coupled over a cluster fabric 106, such as a computing network embodied as a private Infiniband or Fibre Channel (FC) network facilitating communication between the storage systems 102 and 104 (and one or more modules, components, etc. therein, such as, nodes 116 and 118, for example). It will be appreciated that while two data storage systems 102 and 104 and two nodes 116 and 118 are illustrated in FIG. 1, that any suitable number of such components is contemplated. In an example, nodes 116, 118 comprise storage controllers (e.g., node 116 may comprise a primary or local storage controller and node 118 may comprise a secondary or remote storage controller) that provide client devices, such as host devices 108, 110, with access to data stored within data storage devices 128, 130. Similarly, unless specifically provided otherwise herein, the same is true for other modules, elements, features, items, etc. referenced herein and/or illustrated in the accompanying drawings. That is, a particular number of components, modules, elements, features, items, etc. disclosed herein is not meant to be interpreted in a limiting manner.

It will be further appreciated that clustered networks are not limited to any particular geographic areas and can be clustered locally and/or remotely. Thus, in one embodiment a clustered network can be distributed over a plurality of storage systems and/or nodes located in a plurality of geographic locations; while in another embodiment a clustered network can include data storage systems (e.g., 102, 104) residing in a same geographic location (e.g., in a single onsite rack of data storage devices).

In the illustrated example, one or more host devices 108, 110 which may comprise, for example, client devices, personal computers (PCs), computing devices used for storage (e.g., storage servers), and other computers or peripheral devices (e.g., printers), are coupled to the respective data storage systems 102, 104 by storage network connections 112, 114. Network connection may comprise a local area network (LAN) or wide area network (WAN), for example, that utilizes Network Attached Storage (NAS) protocols, such as a Common Internet File System (CIFS) protocol or a Network File System (NFS) protocol to exchange data packets. Illustratively, the host devices 108, 110 may be general-purpose computers running applications, and may interact with the data storage systems 102, 104 using a client/server model for exchange of information. That is, the host device may request data from the data storage system (e.g., data on a storage device managed by a network storage control configured to process I/O commands issued by the host device for the storage device), and the data storage system may return results of the request to the host device via one or more network connections 112, 114.

The nodes 116, 118 on clustered data storage systems 102, 104 can comprise network or host nodes that are interconnected as a cluster to provide data storage and management services, such as to an enterprise having remote locations, for example. Such a node in a data storage and management network cluster environment 100 can be a device attached to the network as a connection point, redistribution point or communication endpoint, for example. A node may be capable of sending, receiving, and/or forwarding information over a network communications channel, and could comprise any device that meets any or all of these criteria. One example of a node may be a data storage and management server attached to a network, where the server can comprise a general purpose computer or a computing device particularly configured to operate as a server in a data storage and management system.

In an example, a first cluster of nodes such as the nodes 116, 118 (e.g., a first set of storage controllers configured to provide access to a first storage aggregate comprising a first logical grouping of one or more storage devices) may be located on a first storage site. A second cluster of nodes, not illustrated, may be located at a second storage site (e.g., a second set of storage controllers configured to provide access to a second storage aggregate comprising a second logical grouping of one or more storage devices). The first cluster of nodes and the second cluster of nodes may be configured according to a disaster recovery configuration (e.g., utilizing information replicated between replication databases at the first storage site and the second storage site) where a surviving cluster of nodes provides switchover access to storage devices of a disaster cluster of nodes in the event a disaster occurs at a disaster storage site comprising the disaster cluster of nodes (e.g., the first cluster of nodes provides client devices with switchover data access to storage devices of the second storage aggregate in the event a disaster occurs at the second storage site).

As illustrated in the exemplary environment 100, nodes 116, 118 can comprise various functional components that coordinate to provide distributed storage architecture for the cluster. For example, the nodes can comprise a network module 120, 122 (e.g., N-Module, or N-Blade) and a data module 124, 126 (e.g., D-Module, or D-Blade). Network modules 120, 122 can be configured to allow the nodes 116, 118 (e.g., network storage controllers) to connect with host devices 108, 110 over the network connections 112, 114, for example, allowing the host devices 108, 110 to access data stored in the distributed storage system. Further, the network modules 120, 122 can provide connections with one or more other components through the cluster fabric 106. For example, in FIG. 1, a first network module 120 of first node 116 can access a second data storage device 130 by sending a request through a second data module 126 of a second node 118.

Data modules 124, 126 can be configured to connect one or more data storage devices 128, 130, such as disks or arrays of disks, flash memory, or some other form of data storage, to the nodes 116, 118. The nodes 116, 118 can be interconnected by the cluster fabric 106, for example, allowing respective nodes in the cluster to access data on data storage devices 128, 130 connected to different nodes in the cluster. Often, data modules 124, 126 communicate with the data storage devices 128, 130 according to a storage area network (SAN) protocol, such as Small Computer System Interface (SCSI) or Fiber Channel Protocol (FCP), for example. Thus, as seen from an operating system on a node 116, 118, the data storage devices 128, 130 can appear as locally attached to the operating system. In this manner, different nodes 116, 118, etc. may access data blocks through the operating system, rather than expressly requesting abstract files.

It should be appreciated that, while the example embodiment 100 illustrates an equal number of N and D modules, other embodiments may comprise a differing number of these modules. For example, there may be a plurality of N and/or D modules interconnected in a cluster that does not have a one-to-one correspondence between the N and D modules. That is, different nodes can have a different number of N and D modules, and the same node can have a different number of N modules than D modules.

Further, a host device 108, 110 can be networked with the nodes 116, 118 in the cluster, over the networking connections 112, 114. As an example, respective host devices 108, 110 that are networked to a cluster may request services (e.g., exchanging of information in the form of data packets) of a node 116, 118 in the cluster, and the node 116, 118 can return results of the requested services to the host devices 108, 110. In one embodiment, the host devices 108, 110 can exchange information with the network modules 120, 122 residing in the nodes (e.g., network hosts) 116, 118 in the data storage systems 102, 104.

In one embodiment, the data storage devices 128, 130 comprise volumes 132, which is an implementation of storage of information onto disk drives or disk arrays or other storage (e.g., flash) as a file-system for data, for example. Volumes can span a portion of a disk, a collection of disks, or portions of disks, for example, and typically define an overall logical arrangement of file storage on disk space in the storage system. In one embodiment a volume can comprise stored data as one or more files that reside in a hierarchical directory structure within the volume.

Volumes are typically configured in formats that may be associated with particular storage systems, and respective volume formats typically comprise features that provide functionality to the volumes, such as providing an ability for volumes to form clusters. For example, where a first storage system may utilize a first format for their volumes, a second storage system may utilize a second format for their volumes.

In the example environment 100, the host devices 108, 110 can utilize the data storage systems 102, 104 to store and retrieve data from the volumes 132. In this embodiment, for example, the host device 108 can send data packets to the N-module 120 in the node 116 within data storage system 102. The node 116 can forward the data to the data storage device 128 using the D-module 124, where the data storage device 128 comprises volume 132A. In this way, in this example, the host device can access the storage volume 132A, to store and/or retrieve data, using the data storage system 102 connected by the network connection 112. Further, in this embodiment, the host device 110 can exchange data with the N-module 122 in the host 118 within the data storage system 104 (e.g., which may be remote from the data storage system 102). The host 118 can forward the data to the data storage device 130 using the D-module 126, thereby accessing volume 132B associated with the data storage device 130.

It may be appreciated that load balancing between storage controllers may be implemented within the clustered network environment 100. In an example, a load balancing component may be implemented for the first data storage site 102. The load balancing component may be configured to balance loads, such as data access to the data storage device 128 for the first data storage site 102. In another example, the load balancing component may be implemented for the second data storage site 104. The load balancing component may be configured to balance loads, such as data access to the data storage device 130 for the second data storage site 104.

Figure 2:
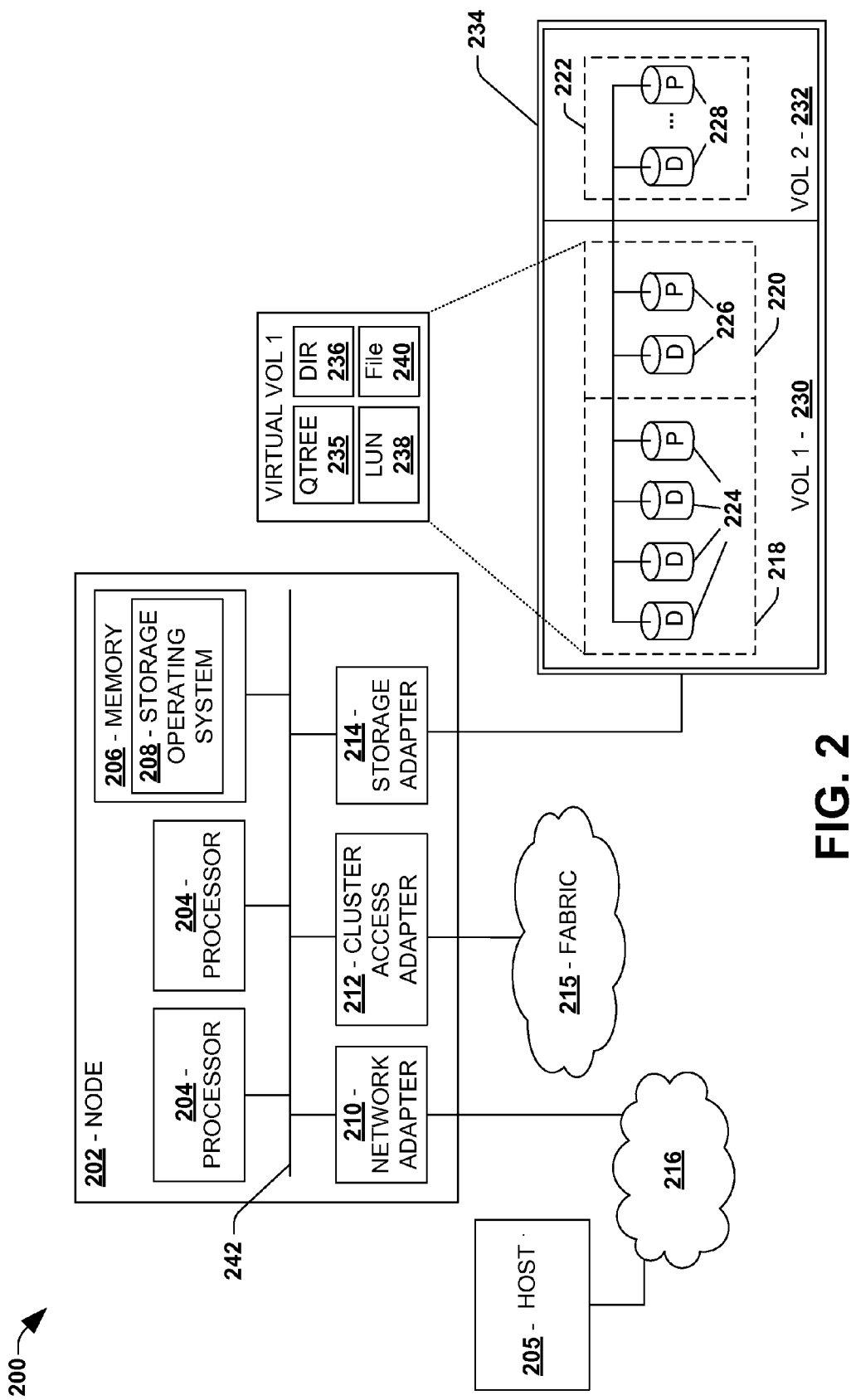
FIG. 2 is a component block diagram illustrating an example data storage system in accordance with one or more of the provisions set forth herein.

FIG. 2 is an illustrative example of a data storage system or storage site 200 (e.g., 102, 104 in FIG. 1), providing further detail of an embodiment of components that may implement one or more of the techniques and/or systems described herein. The example data storage system 200 comprises a node 202 (e.g., host nodes 116, 118 in FIG. 1), and a data storage device 234 (e.g., data storage devices 128, 130 in FIG. 1). The node 202 may be a general purpose computer, for example, or some other computing device particularly configured to operate as a storage server. A host device 205 (e.g., 108, 110 in FIG. 1) can be connected to the node 202 over a network 216, for example, to provide access to files and/or other data stored on the data storage device 234. In an example, the node 202 comprises a storage controller that provides client devices, such as the host device 205, with access to data stored within data storage device 234.

The data storage device 234 can comprise mass storage devices, such as disks 224, 226, 228 of a disk array 218, 220, 222. It will be appreciated that the techniques and systems, described herein, are not limited by the example embodiment. For example, disks 224, 226, 228 may comprise any type of mass storage devices, including but not limited to magnetic disk drives, flash memory, and any other similar media adapted to store information, including, for example, data (D) and/or parity (P) information.

The node 202 comprises one or more processors 204, a memory 206, a network adapter 210, a cluster access adapter 212, and a storage adapter 214 interconnected by a system bus 242. The storage system 200 also includes an operating system 208 installed in the memory 206 of the node 202 that can, for example, implement a Redundant Array of Independent (or Inexpensive) Disks (RAID) optimization technique to optimize a reconstruction process of data of a failed disk in an array.

The operating system 208 can also manage communications for the data storage system, and communications between other data storage systems that may be in a clustered network, such as attached to a cluster fabric 215 (e.g., 106 in FIG. 1). Thus, the node 202, such as a network storage controller, can respond to host device requests to manage data on the data storage device 234 (e.g., or additional clustered devices) in accordance with these host device requests. The operating system 208 can often establish one or more file systems on the data storage system 200, where a file system can include software code and data structures that implement a persistent hierarchical namespace of files and directories, for example. As an example, when a new data storage device (not shown) is added to a clustered network system, the operating system 208 is informed where, in an existing directory tree, new files associated with the new data storage device are to be stored. This is often referred to as "mounting" a file system.

In the example data storage system 200, memory 206 can include storage locations that are addressable by the processors 204 and adapters 210, 212, 214 for storing related software program code and data structures. The processors 204 and adapters 210, 212, 214 may, for example, include processing elements and/or logic circuitry configured to execute the software code and manipulate the data structures. The operating system 208, portions of which are typically resident in the memory 206 and executed by the processing elements, functionally organizes the storage system by, among other things, invoking storage operations in support of a file service implemented by the storage system. It will be apparent to those skilled in the art that other processing and memory mechanisms, including various computer readable media, may be used for storing and/or executing program instructions pertaining to the techniques described herein. For example, the operating system can also utilize one or more control files (not shown) to aid in the provisioning of virtual machines.

The network adapter 210 includes the mechanical, electrical and signaling circuitry needed to connect the data storage system 200 to a host device 205 over a computer network 216, which may comprise, among other things, a point-to-point connection or a shared medium, such as a local area network. The host device 205 (e.g., 108, 110 of FIG. 1) may be a general-purpose computer configured to execute applications. As described above, the host device 205 may interact with the data storage system 200 in accordance with a client/host model of information delivery.

The storage adapter 214 cooperates with the operating system 208 executing on the node 202 to access information requested by the host device 205 (e.g., access data on a storage device managed by a network storage controller). The information may be stored on any type of attached array of writeable media such as magnetic disk drives, flash memory, and/or any other similar media adapted to store information. In the example data storage system 200, the information can be stored in data blocks on the disks 224, 226, 228. The storage adapter 214 can include input/output (I/O) interface circuitry that couples to the disks over an I/O interconnect arrangement, such as a storage area network (SAN) protocol (e.g., Small Computer System Interface (SCSI), iSCSI, hyperSCSI, Fiber Channel Protocol (FCP)). The information is retrieved by the storage adapter 214 and, if necessary, processed by the one or more processors 204 (or the storage adapter 214 itself) prior to being forwarded over the system bus 242 to the network adapter 210 (and/or the cluster access adapter 212 if sending to another node in the cluster) where the information is formatted into a data packet and returned to the host device 205 over the network connection 216 (and/or returned to another node attached to the cluster over the cluster fabric 215).

In one embodiment, storage of information on arrays 218, 220, 222 can be implemented as one or more storage "volumes" 230, 232 that are comprised of a cluster of disks 224, 226, 228 defining an overall logical arrangement of disk space. The disks 224, 226, 228 that comprise one or more volumes are typically organized as one or more groups of RAIDs. As an example, volume 230 comprises an aggregate of disk arrays 218 and 220, which comprise the cluster of disks 224 and 226.

In one embodiment, to facilitate access to disks 224, 226, 228, the operating system 208 may implement a file system (e.g., write anywhere file system) that logically organizes the information as a hierarchical structure of directories and files on the disks. In this embodiment, respective files may be implemented as a set of disk blocks configured to store information, whereas directories may be implemented as specially formatted files in which information about other files and directories are stored.

Whatever the underlying physical configuration within this data storage system 200, data can be stored as files within physical and/or virtual volumes, which can be associated with respective volume identifiers, such as file system identifiers (FSIDs), which can be 32-bits in length in one example.

A physical volume corresponds to at least a portion of physical storage devices whose address, addressable space, location, etc. doesn't change, such as at least some of one or more data storage devices 234 (e.g., a Redundant Array of Independent (or Inexpensive) Disks (RAID system)). Typically the location of the physical volume doesn't change in that the (range of) address(es) used to access it generally remains constant.

A virtual volume, in contrast, is stored over an aggregate of disparate portions of different physical storage devices. The virtual volume may be a collection of different available portions of different physical storage device locations, such as some available space from each of the disks 224, 226, and/or 228. It will be appreciated that since a virtual volume is not "tied" to any one particular storage device, a virtual volume can be said to include a layer of abstraction or virtualization, which allows it to be resized and/or flexible in some regards.

Further, a virtual volume can include one or more logical unit numbers (LUNs) 238, directories 236, qtrees 235, and files 240. Among other things, these features, but more particularly LUNS, allow the disparate memory locations within which data is stored to be identified, for example, and grouped as data storage unit. As such, the LUNs 238 may be characterized as constituting a virtual disk or drive upon which data within the virtual volume is stored within the aggregate. For example, LUNs are often referred to as virtual drives, such that they emulate a hard drive from a general purpose computer, while they actually comprise data blocks stored in various parts of a volume.

In one embodiment, one or more data storage devices 234 can have one or more physical ports, wherein each physical port can be assigned a target address (e.g., SCSI target address). To represent respective volumes stored on a data storage device, a target address on the data storage device can be used to identify one or more LUNs 238. Thus, for example, when the node 202 connects to a volume 230, 232 through the storage adapter 214, a connection between the node 202 and the one or more LUNs 238 underlying the volume is created.

In one embodiment, respective target addresses can identify multiple LUNs, such that a target address can represent multiple volumes. The I/O interface, which can be implemented as circuitry and/or software in the storage adapter 214 or as executable code residing in memory 206 and executed by the processors 204, for example, can connect to volume 230 by using one or more addresses that identify the LUNs 238.

It may be appreciated that load balancing between storage controllers may be implemented for the data storage system or storage site 200. For example, a load balancing component may be implemented for the data storage system or storage site 200. The load balancing component may be configured to balance loads, such as data access to the data storage devices 234, for the data storage site 200.

Figure 3:
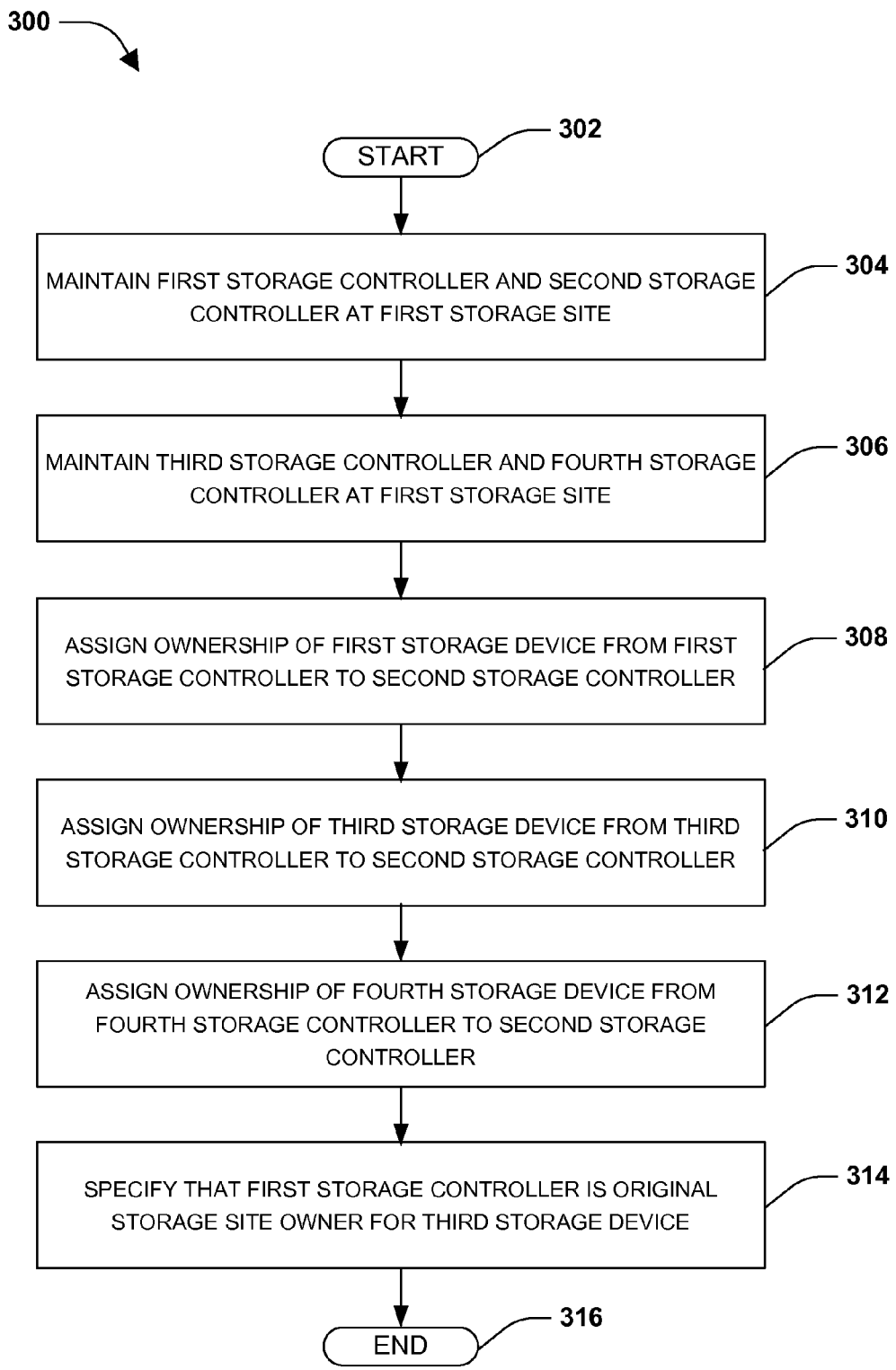
FIG. 3 is a flow chart illustrating an exemplary method of load balancing between storage controllers.
Figure 4A:
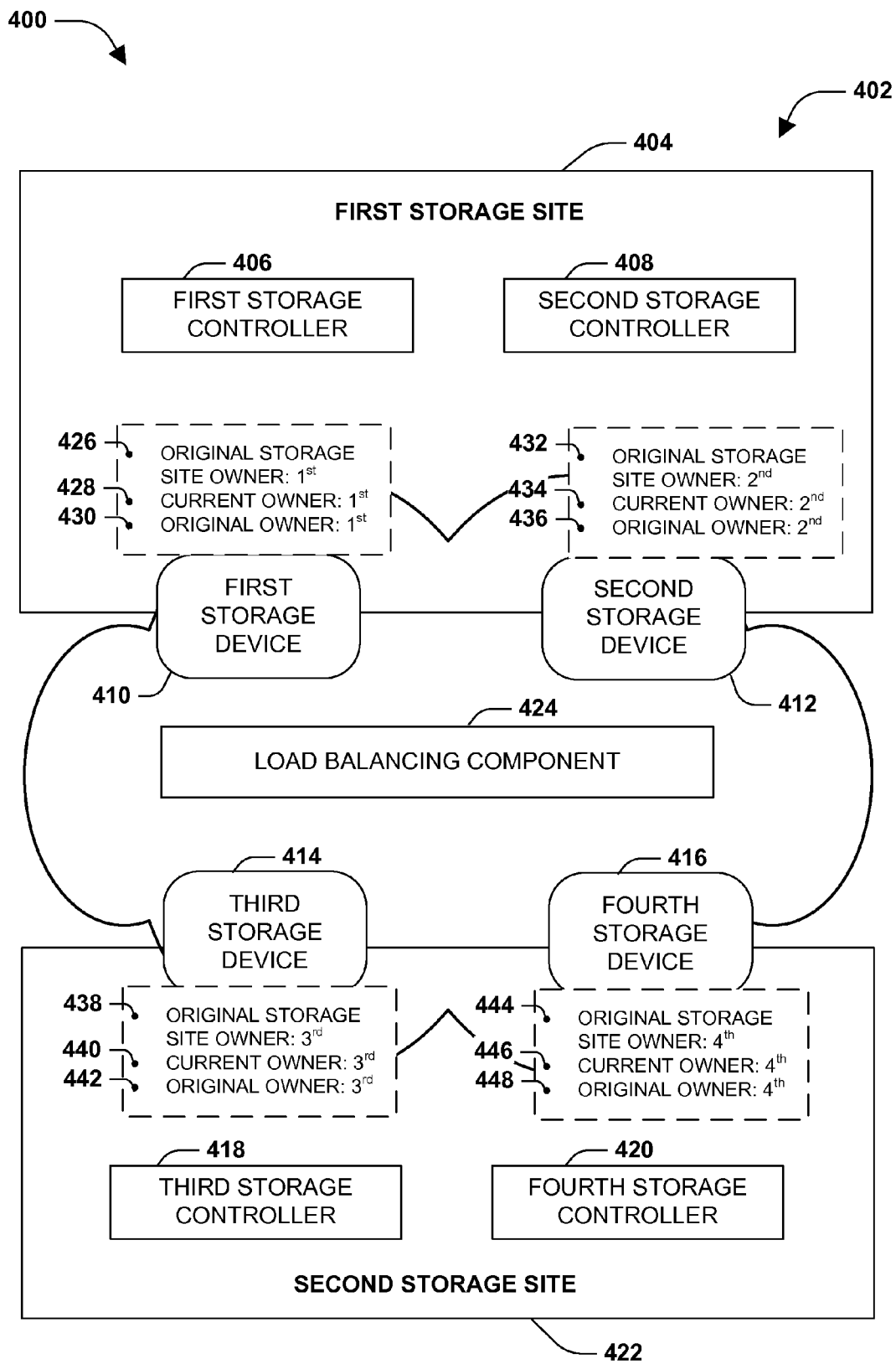
FIG. 4A is an example of a first storage controller and a second storage controller being maintained at a first storage site, and a third storage controller and a fourth storage controller being maintained at a second storage site.

One embodiment of load balancing between storage controllers is illustrated by an exemplary method 300 of FIG. 3, and an example 400 of a system 402, comprising a load balancing component 424, for load balancing between storage controllers is illustrated in FIGS. 4A-4E. At 302, the method starts. At 304, a first storage controller 406 and a second storage controller 408 are maintained at a first storage site 404, as illustrated in FIG. 4A. The first storage controller

406 may be configured to provide client devices with data access to a first storage device 410. The second storage controller 408 may be configured to provide client devices with data access to a second storage device 412. In an example, the first storage controller 406 and the second storage controller 408 are maintained according to a high availability configuration where a storage controller is configured to provide failover access to storage devices of a failed storage controller (e.g., responsive to the second storage controller 408 failing, the first storage controller 406 may provide client devices with failover data access to the second storage device 412).

At 306, a third storage controller 418 and a fourth storage controller 420 are maintained at a second storage site 422. The third storage controller 418 may be configured to provide client devices with data access to a third storage device 414. The fourth storage controller 420 may be configured to provide client devices with data access to a fourth storage device 416. In an example, the third storage controller 418 and the fourth storage controller 420 are maintained according to a high availability configuration where a storage controller is configured to provide failover access to storage devices of a failed storage controller (e.g., responsive to the fourth storage controller 420 failing, the third storage controller 418 may provide client devices with failover data access to the fourth storage device 416).

The first storage site 404 and the second storage site 422 may be configured according to a disaster recovery configuration. For example, the first storage controller 406 and the third storage controller 418 may be disaster recovery partners where a storage controller at a surviving site is configured to provide switchover access to storage devices of an unavailable controller at a disaster site (e.g., when a disaster occurs at the second storage site 422, the first storage controller 406 may acquire ownership of and/or provide client devices with switchover data access to the third storage device 414 based upon the first storage controller 406 being a disaster recovery partner of the third storage controller 414). Similarly, the second storage controller 408 and the fourth storage controller 420 may be configured according to a disaster recovery configuration (e.g., when a disaster occurs at the second storage site 422, the second storage controller 408 may acquire ownership of and/or provide client device with switchover data access to the fourth storage device 416 based upon the second storage controller 408 being a disaster recovery partner of the fourth storage controller 420).

Storage devices may comprise a variety of properties whose values may be set to track various types of ownership for such devices. In an example, an original owner property may be set to a storage controller that is an original owner configured to provide normal operation for a storage device (e.g., a first original owner property 430 of the first storage device 410 may be set to the first storage controller 406, a second original owner property 436 of the second storage device 412 may be set to the second storage controller 408, a third original owner property 442 of the third storage device 414 may be set to the third storage controller 418, and a fourth original owner property 448 of the fourth storage device 416 may be set to the fourth storage controller 420).

In another example, a current owner property may be set to a storage controller that has taken ownership of a storage device and provides client devices with data access to the storage device (e.g., a first current owner property 428 of the first storage device 410 may be initially set to the first storage controller 406, a second current owner property 434 of the second storage device 412 may be initially set to the second storage controller 408, a third current owner property 440 of the third storage device 414 may be initially set to the third storage controller 418, and a fourth current owner property 446 of the fourth storage device 416 may be initially set to the fourth storage controller 420).

In another example, an original storage site owner property may be set to a storage controller that is either an original owner of a storage device or a disaster recovery partner for the original owner of the storage device (e.g., a first original storage site owner property 426 of the first storage device 410 may be initially set to the first storage controller 406 and may be set to the third storage controller 418 in the event of a switchover from a disaster recovery at the first storage site 404, a second original storage site owner property 432 of the second storage device 412 may be initially set to the second storage controller 408 and may be set to the fourth storage controller 416 in the event of a switchover from a disaster recovery at the first storage site 404, a third original storage site owner property 438 of the third storage device 414 may be initially set to the third storage controller 418 and may be set to the first storage controller 406 in the event of a switchover from a disaster recovery at the second storage site 422, and a fourth original storage site owner property 444 of the fourth storage device 416 may be initially set to the fourth storage controller 420 and may be set to the second storage controller 408 in the event of a switchover from a disaster recovery at the second storage site 422).

Figure 4B:
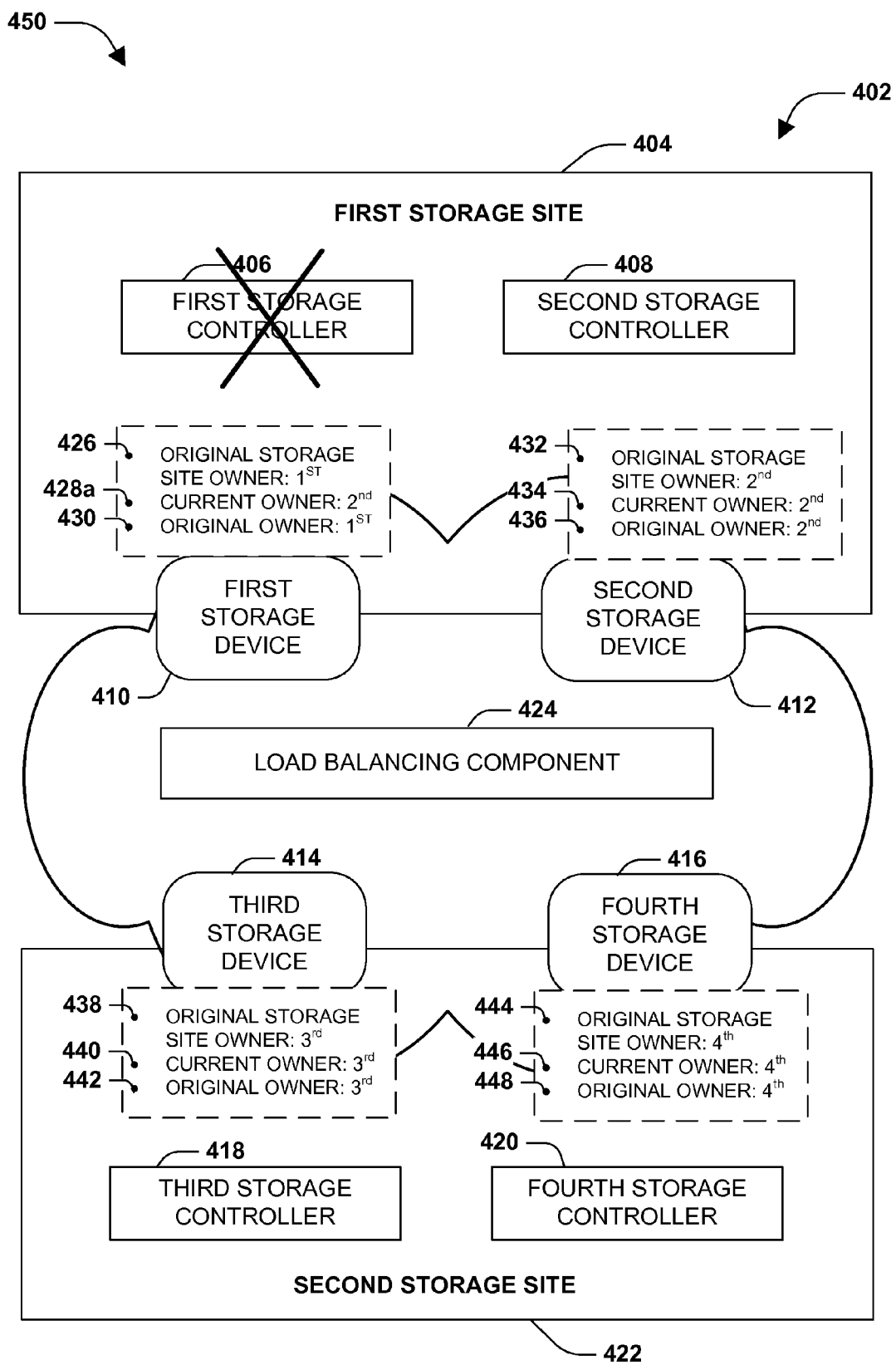
FIG. 4B is an example of identifying a failure of a first storage controller.

A failure of the first storage controller 406 may be identified, as illustrated in example 450 of FIG. 4B. At 308, ownership of the first storage device 410 may be assigned from the first storage controller 406 to the second storage controller 408 for failover operation of the first storage device 410 by the second storage controller 408 (e.g., based upon the high availability configuration between the first storage device 406 and the second storage device 408). For example, the first current owner property 428 of the first storage device 410 may be switched from the first storage controller 406 to the second storage controller 408, resulting in a first current owner property 428a indicating that the second storage controller 408 is the current owner that is providing client devices with failover data access to the first storage device 410.

Figure 4C:
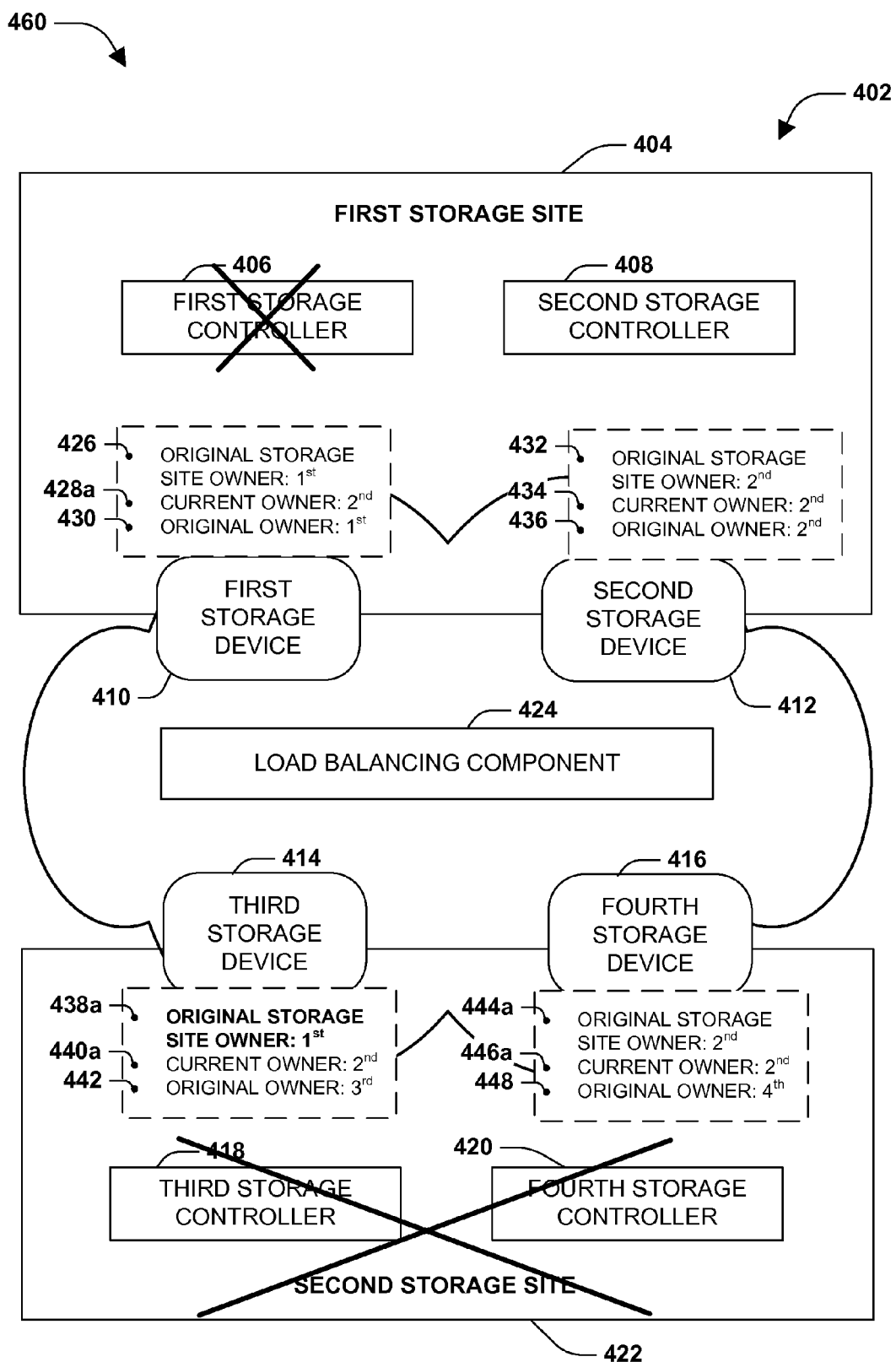
FIG. 4C is an example of identifying a disaster of a second storage site.

A disaster of the second storage site 422 may be identified, as illustrated in example 460 of FIG. 4C. At 310, ownership of the third storage device 414 (e.g., ownership of a mirrored copy/plex of the third storage device 414 located at the first storage site 404, which may be unaffected by the disaster) may be assigned, such as by the load balancing component 424, from the third storage controller 418 (e.g., which may be unavailable due to the disaster) to the second storage controller 408 (e.g., and not the first storage controller 406 due to the first storage controller 406 currently being in a failed state) for switchover operation of the third storage device 414. Thus, the third current owner property 440 of the third storage device 414 (e.g., or mirrored copy) may be switched, such as by the load balancing component 424, from the third storage controller 418 to the second storage controller 408, resulting in a third current owner property 440a indicating that the second storage controller 408 is the current owner that is providing client devices with switchover data access to the third storage device 414.

At 312, ownership of the fourth storage device 416 (e.g., ownership of a mirrored copy/plex of the fourth storage device 416 located at the first storage site 404, which may be unaffected by the disaster) may be assigned, such as by the load balancing component 424, from the fourth storage controller 420 to the second storage controller 408 (e.g., because the second storage controller 408 is a disaster recovery partner with the fourth storage controller 420) for switchover operation of the fourth storage device 416. Thus, the fourth current owner property 446 of the fourth storage device 416 (e.g., or mirrored copy) may be switched, such as by the load balancing component 424, from the fourth storage controller 420 to the second storage controller 408, resulting in a fourth current owner property 446a indicating that the second storage controller 408 is the current owner that is providing client devices with switchover data access to the fourth storage device 416. In this way, the second storage controller 408 provides switchover data access to the third storage device 414 (e.g., or mirrored copy) and the fourth storage device 416 (e.g., or mirrored copy), failover data access to the first storage device 410, and normal data access to the second storage device 412.

It may be appreciated that a storage device, as used herein, may comprise an original storage device and/or one or more mirrored copies of the original storage device (e.g., as data is written to the original storage device, such data may be mirrored to a mirrored storage device for redundancy, failover, switchover, and/or backup purposes). For example, the second storage controller 408 may be configured to provide data access to the second storage device 412 (e.g., an original storage device), while the third storage controller 414 and/or the fourth storage controller 416 may be configured to provide data access to a mirrored copy of the second storage device 412.

At 314, the first storage controller 406 is specified, such as by the load balancing component 424, as a current site owner for the third storage device 414 notwithstanding the first storage controller 406 being in the failed state because the first storage controller 406 is the disaster recovery partner of the third storage controller 418 and the first storage site 404 is providing switchover operation for the second storage site 422 due to the disaster. Thus, the third original storage site owner property 438 may be switched from the third storage controller 418 to the first storage controller 406 to create a third original storage site owner property 438a because the first storage site 404 such as the second storage controller 408 is providing switchover operation for the third storage device 414 and the first storage controller 406 is the disaster recovery partner for the third storage controller 418. The fourth original storage site owner property 444 may be switched, such as by the load balancing component 424, from the fourth storage controller 420 to the second storage controller 408 because the second storage controller 408 is providing switch operation for the fourth storage device 416 and the second storage controller 408 is the disaster recovery partner for the fourth storage controller 420.

In an example not illustrated, responsive to identifying restoration of the second storage site 422, ownership of the third storage device 414 may be switched from the second storage controller 408 to the third storage controller 418 for normal operation of the third storage device 414 by the third storage controller 418 based upon the third original owner property 442 being set to the third storage controller 418. Ownership of the fourth storage device 416 may be switched from the second storage controller 408 to the fourth storage controller 420 for normal operation of the fourth storage device 416 based upon the original owner property 448 being set to the fourth storage controller 420.

Figure 4D:
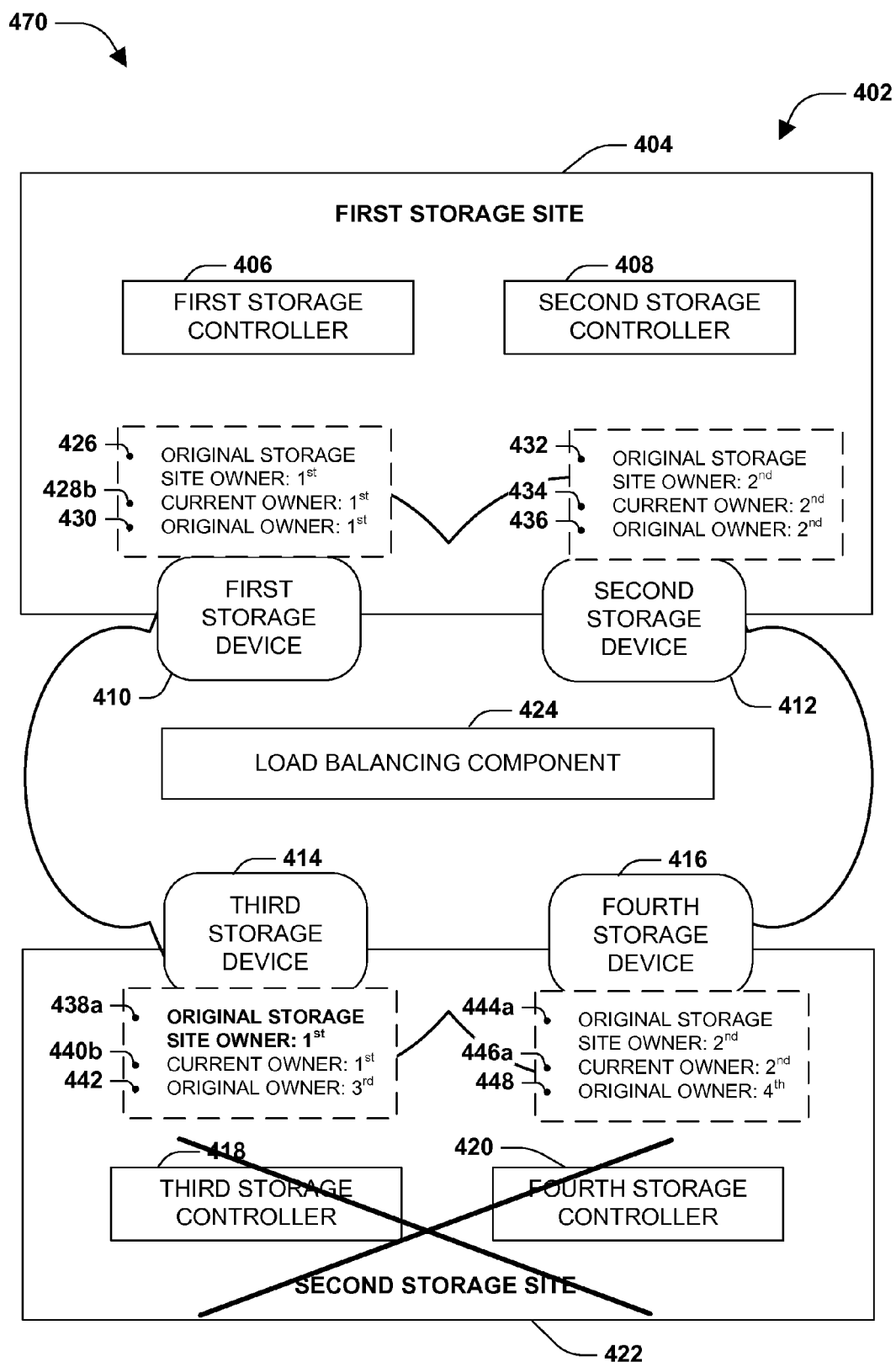
FIG. 4D is an example of identifying restoration of a first storage controller.

Restoration of the first storage controller 406 may be identified, as illustrated in example 470 of FIG. 4D. Ownership of the third storage device 414 may be assigned, such as by the load balancing component 424, from the second storage controller 408 to the first storage controller 406 based upon the third original storage site owner property 438a of the third storage device 414 specifying that the first storage controller 406 is an original storage site owner (e.g., because the first storage controller 406 is the disaster recovery partner for the third storage controller 418). Thus, the first storage controller 406 may be invoked to provide switchover operation for the third storage device 414, and the third current owner property 440a of the third storage device 414 may be set to the first storage controller 406, resulting in a third current owner property 440b. Ownership of the first storage device 410 may be assigned, such as by the load balancing component 424, from the second storage controller 408 to the first storage controller 406 based upon the first original owner property 430 of the first storage device 410 specifying that the first storage controller 406 is the original owner configured to provide normal operation for the first storage device 410. Thus, the first current owner property 428a may be set to the first storage controller 406, resulting in a first current owner property 428b.

In an example of evaluating ownership of storage devices based upon restoration of the first storage controller 406, the load balancing component 424 may be configured to provide automated load balancing of the first storage device 410, the second storage device 412, the third storage device 414, and the fourth storage device 416 between the first storage controller 406 and the second storage controller 408. The load balancing component 424 may evaluate original storage site owner property information, current owner property information, and/or original owner property information of storage devices. For example, the load balancing component 424 may invoke the second storage controller 408 to determine that the third original storage site owner property 438a of the third storage device 414 specifies that the first storage controller 406 is the original storage site owner (e.g., based upon the first storage controller 406 being the disaster recovery partner for the third storage controller 418 and the first storage site 404 providing switchover operation for the second storage site 422), and thus the second storage controller 408 may assign ownership of the third storage device 414 to the first storage controller 406 in order for the first storage controller 406 to provide switchover data access to the third storage device 414. In this way, automated load balancing is provided at a surviving site during disaster recovery at a disaster site.

Figure 4E:
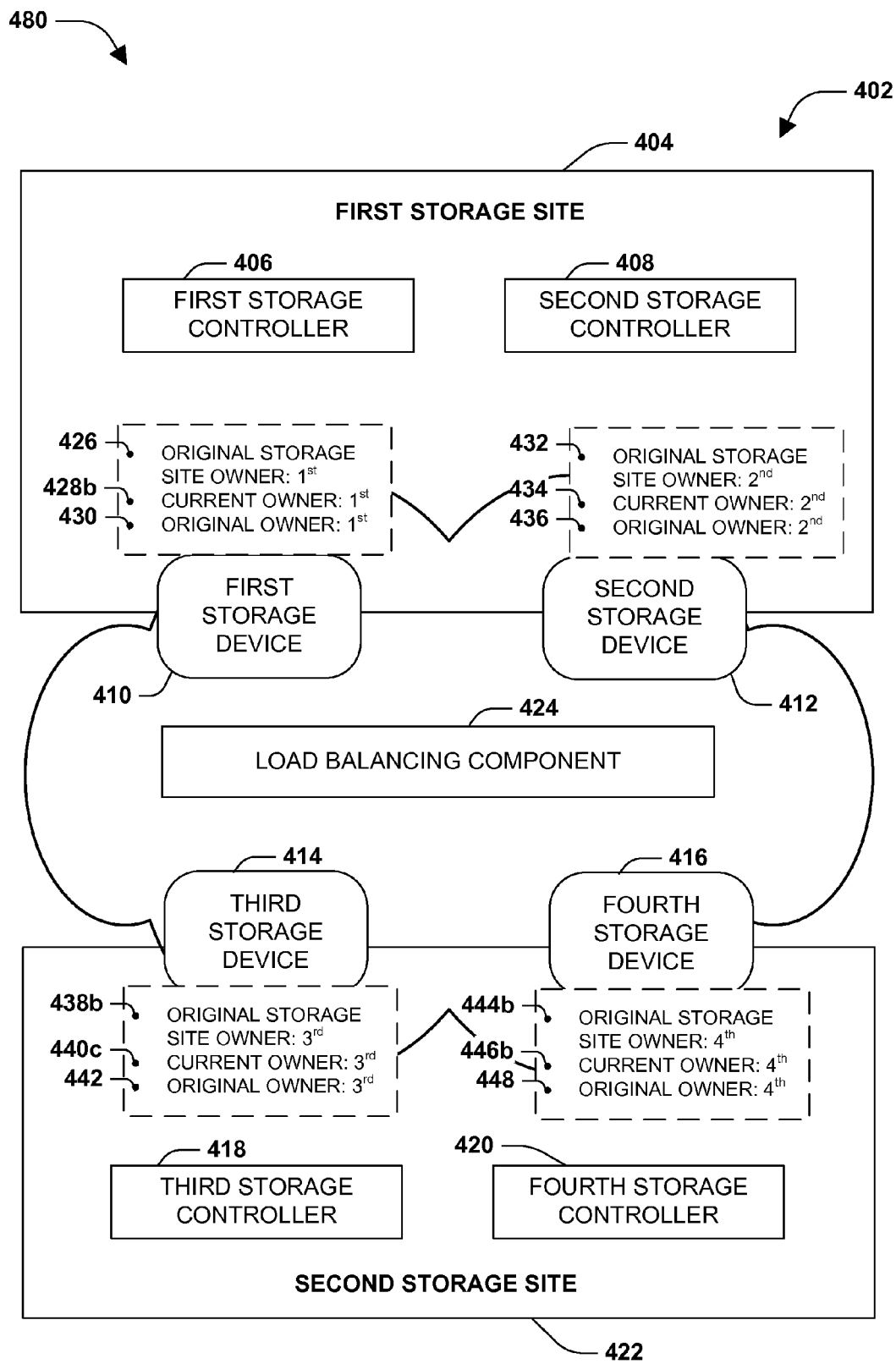
FIG. 4E is an example of identifying restoration of a second storage site.

Restoration of the second storage site 422 may be identified, as illustrated in example 480 of FIG. 4E. Ownership of the third storage device 414 may be assigned, such as by the load balancing component 424, from the first storage controller 406 to the third storage controller 418. Thus, the third current owner property 440b and the third original storage site owner property 438a of the third storage device 414 may be switched from the first storage controller 406 to the third storage controller 418, resulting in a third current owner property 440c and a third original storage site owner 438b. Ownership of the fourth storage device 416 may be assigned, such as by the load balancing component 424, from the second storage controller 408 to the fourth storage controller 408. Thus, the fourth current owner property 446a and the fourth original storage site owner property 444a of the fourth storage device 416 may be switched from the second storage controller 408 to the fourth storage controller 420, resulting in a fourth current owner property 446b and a fourth original storage site owner property 444b. At 316, the method ends.

Figure 5:
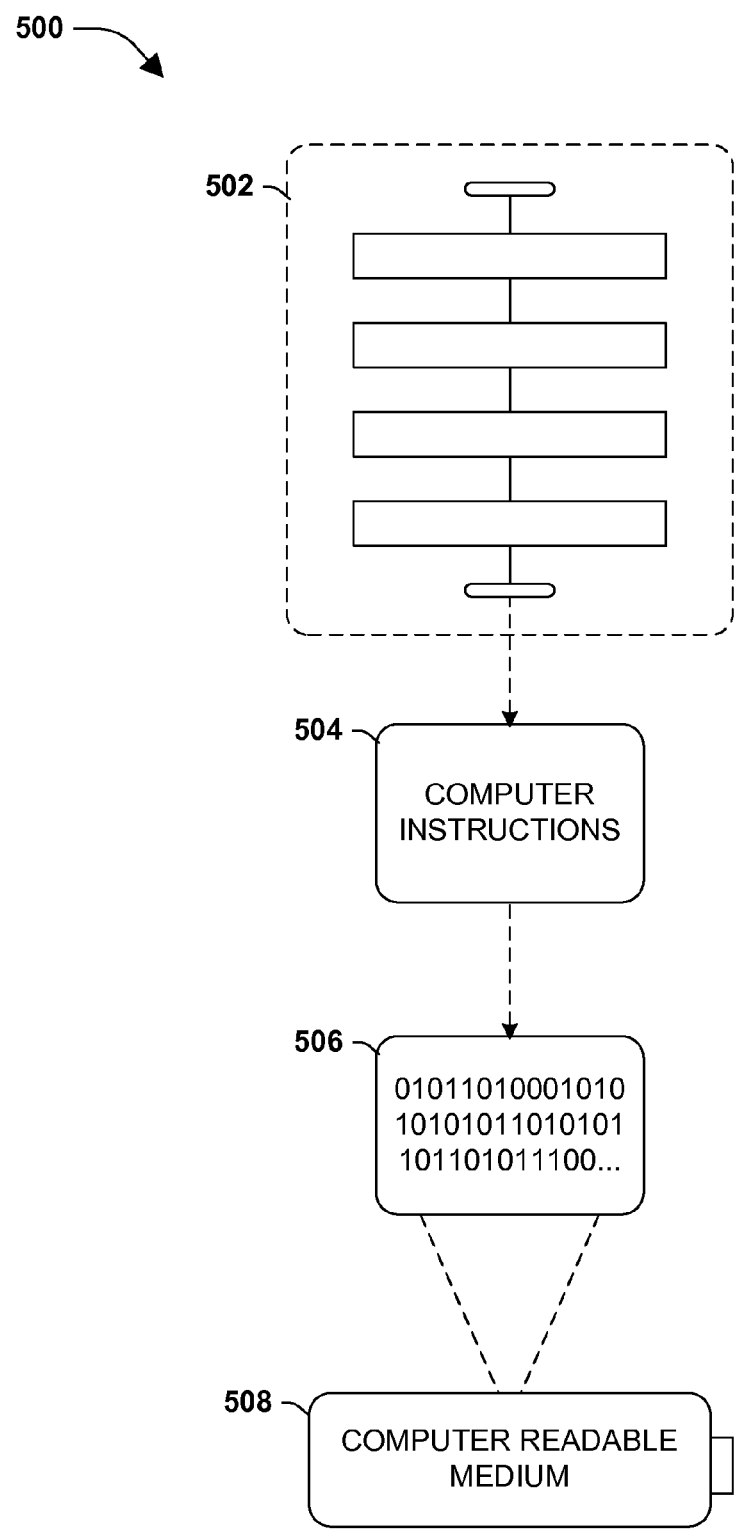
FIG. 5 is an example of a computer readable medium in accordance with one or more of the provisions set forth herein.

Still another embodiment involves a computer-readable medium comprising processor-executable instructions configured to implement one or more of the techniques presented herein. An example embodiment of a computer-readable medium or a computer-readable device that is devised in these ways is illustrated in FIG. 5, wherein the implementation 500 comprises a computer-readable medium 508, such as a CD-R, DVD-R, flash drive, a platter of a hard disk drive, etc., on which is encoded computer-readable data 506. This computer-readable data 506, such as binary data comprising at least one of a zero or a one, in turn comprises a set of computer instructions 504 configured to operate according to one or more of the principles set forth herein. In some embodiments, the processor-executable computer instructions 504 are configured to perform a method 502, such as at least some of the exemplary method 300 of FIG. 3, for example. In some embodiments, the processor-executable instructions 504 are configured to implement a system, such as at least some of the exemplary system 402 of FIGS. 4A-4E, for example. Many such computer-readable media are contemplated to operate in accordance with the techniques presented herein.

It will be appreciated that processes, architectures and/or procedures described herein can be implemented in hardware, firmware and/or software. It will also be appreciated that the provisions set forth herein may apply to any type of special-purpose computer (e.g., file host, storage server and/or storage serving appliance) and/or general-purpose computer, including a standalone computer or portion thereof, embodied as or including a storage system. Moreover, the teachings herein can be configured to a variety of storage system architectures including, but not limited to, a network-attached storage environment and/or a storage area network and disk assembly directly attached to a client or host computer. Storage system should therefore be taken broadly to include such arrangements in addition to any subsystems configured to perform a storage function and associated with other equipment or systems.

In some embodiments, methods described and/or illustrated in this disclosure may be realized in whole or in part on computer-readable media. Computer readable media can include processor-executable instructions configured to implement one or more of the methods presented herein, and may include any mechanism for storing this data that can be thereafter read by a computer system. Examples of computer readable media include (hard) drives (e.g., accessible via network attached storage (NAS)), Storage Area Networks (SAN), volatile and non-volatile memory, such as read-only memory (ROM), random-access memory (RAM), EEPROM and/or flash memory, CD-ROMs, CD-Rs, CD-RWs, DVDs, cassettes, magnetic tape, magnetic disk storage, optical or non-optical data storage devices and/or any other medium which can be used to store data.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments are provided herein. The order in which some or all of the operations are described should not be construed to imply that these operations are necessarily order dependent. Alternative ordering will be appreciated given the benefit of this description. Further, it will be understood that not all operations are necessarily present in each embodiment provided herein. Also, it will be understood that not all operations are necessary in some embodiments.

Furthermore, the claimed subject matter is implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

As used in this application, the terms "component", "module," "system", "interface", and the like are generally intended to refer to a computer-related entity, either hardware, a combination of hardware and software, software, or software in execution. For example, a component includes a process running on a processor, a processor, an object, an executable, a thread of execution, a program, or a computer. By way of illustration, both an application running on a controller and the controller can be a component. One or more components residing within a process or thread of execution and a component may be localized on one computer or distributed between two or more computers.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B and/or both A and B. Furthermore, to the extent that "includes", "having", "has", "with", or variants thereof are used, such terms are intended to be inclusive in a manner similar to the term "comprising".

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first set of information and a second set of information generally correspond to set of information A and set of information B or two different or two identical sets of information or the same set of information.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method comprising:
    identifying a first storage controller and a second storage controller maintained at a first storage site, the first storage controller providing access to a first storage device, the second storage controller providing access to a second storage device;
    identifying a third storage controller and a fourth storage controller maintained at a second storage site, the third storage controller providing access to a third storage device, the fourth storage controller providing access to a fourth storage device;

responsive to identifying a failure of the first storage controller, assigning ownership of the first storage device from the first storage controller to the second storage controller for failover operation of the first storage device; and responsive to identifying a disaster of the second storage site:

assigning ownership of the third storage device from the third storage controller to the second storage controller for switchover operation of the third storage device;

assigning ownership of the fourth storage device from the fourth storage controller to the second storage controller for switchover operation of the fourth storage device; and specifying that the first storage controller is an original storage site owner for the third storage device.

2. The method of claim 1, comprising:

responsive to identifying restoration of the first storage controller:

assigning ownership of the third storage device from the second storage controller to the first storage controller based upon the first storage controller being the original storage site owner; and invoking the first storage controller to provide switchover operation for the third storage device.

3. The method of claim 1, comprising:

responsive to identifying restoration of the first storage controller, assigning ownership of the first storage device from the second storage controller to the first storage controller for normal operation of the first storage device.

4. The method of claim 2, comprising:

responsive to identifying restoration of the second storage site:

assigning ownership of the third storage device from the first storage controller to the third storage controller for normal operation of the third storage device; and assigning ownership of the fourth storage device from the second storage controller to the fourth storage controller for normal operation of the fourth storage device.

5. The method of claim 1, comprising:

responsive to identifying restoration of the second storage site:

assigning ownership of the third storage device from the second storage controller to the third storage controller for normal operation of the third storage device; and assigning ownership of the fourth storage device from the second storage controller to the fourth storage controller for normal operation of the fourth storage device.

6. The method of claim 1, wherein the specifying comprises:

setting an original storage site owner property of the third storage device to the first storage controller based upon the first storage controller having a disaster recovery partnership with the first storage controller.

7. The method of claim 1, comprising:

setting a current owner property of the third storage device to the second storage controller based upon the second storage controller being assigned current ownership of the third storage device to provide data access to the third storage device.

8. The method of claim 1, comprising:

setting an original owner property of the third storage device to the third storage controller based upon the third storage controller being an original owner configured to provide normal operation for the third storage device.

9. The method of claim 1, wherein the assigning ownership of the first storage device to the second storage controller comprises:

invoking the second storage controller to provide failover data access to the first storage device.

10. The method of claim 1, wherein the assigning ownership of the third storage device and the assigning ownership of the fourth storage device comprises:

invoking the second storage controller to provide switchover data access to the third storage device and the fourth storage device.

11. The method of claim 1, comprising:

responsive to identifying restoration of the first storage controller:

evaluating an original storage site owner property of the third storage device; and responsive to determining that an original storage site owner property of the third storage device is set to the first storage controller:

assigning ownership of the third storage device from the second storage controller to the first storage controller; and invoking the first storage controller to provide switchover data access for the third storage device.

12. The method of claim 1, comprising:

responsive to identifying restoration of the first storage controller, providing automated load balancing of the first storage device, the second storage device, the third storage device, and the fourth storage device between the first storage controller and the second storage controller based upon original storage site owner property information.

13. A computing device comprising:

a memory containing machine readable medium comprising machine executable code having stored thereon instructions for performing a method of replication; and a processor coupled to the memory, the processor configured to execute the machine executable code to cause the processor to:

identify a first storage controller and a second storage controller maintained at a first storage site, the first storage controller providing access to a first storage device, the second storage controller providing access to a second storage device;

identify a third storage controller and a fourth storage controller maintained at a second storage site, the third storage controller providing access to a third storage device, the fourth storage controller providing access to a fourth storage device;

responsive to identifying a failure of the first storage controller, assign ownership of the first storage device from the first storage controller to the second storage controller for failover operation of the first storage device; and responsive to identifying a disaster of the second storage site:

assign ownership of the third storage device from the third storage controller to the second storage controller for switchover operation of the third storage device;

assign ownership of the fourth storage device from the fourth storage controller to the second storage controller for switchover operation of the fourth storage device; and specify the first storage controller as an original storage site owner for the third storage device.

14. The computing device of claim 13, wherein the machine executable code causes the processor to:
responsive to identifying restoration of the first storage controller:
evaluate original storage site owner properties of storage devices associated with the first storage site and the second storage site; and
responsive to determining that an original storage site owner property of the third storage device is set to the first storage controller:
assign ownership of the third storage device from the second storage controller to the first storage controller; and
invoke the first storage controller to provide switchover data access to the third storage device.

15. The computing device of claim 13, wherein the machine executable code causes the processor to:
responsive to identifying restoration of the first storage controller:
assign ownership of the third storage device from the second storage controller to the first storage controller based upon the first storage controller being the original storage site owner; and
invoke the first storage controller to provide switchover operation for the third storage device.

16. The computing device of claim 15, wherein the machine executable code causes the processor to:
responsive to identifying restoration of the second storage site:
assign ownership of the third storage device from the first storage controller to the third storage controller for normal operation of the third storage device; and
assign ownership of the fourth storage device from the second storage controller to the fourth storage controller for normal operation of the fourth storage device.

17. The computing device of claim 13, wherein the machine executable code causes the processor to:
responsive to identifying restoration of the first storage controller, provide automated load balancing of the first storage device, the second storage device, the third storage device, and the fourth storage device between the first storage controller and the second storage controller based upon original storage site owner property information.

18. The computing device of claim 14, wherein the machine executable code causes the processor to at least one of:

set an original storage site owner property of the third storage device to the first storage controller based upon the first storage controller having a disaster recovery partnership with the first storage controller;
set a current owner property of the third storage device to the second storage controller based upon the second storage controller being assigned ownership of the third storage device to provide data access to the third storage device; or
set an original owner property of the third storage device to the third storage controller based upon the third storage controller being an original owner configured to provide normal operation of the third storage device.

19. A non-transitory computer readable medium having stored thereon instructions for performing a method comprising machine executable code which when executed by at least one machine, causes the machine to:
identify a first storage controller and a second storage controller maintained at a first storage site, the first storage controller providing access to a first storage device, the second storage controller providing access to a second storage device;
identify a third storage controller and a fourth storage controller maintained at a second storage site, the third storage controller providing access to a third storage device, the fourth storage controller providing access to a fourth storage device;
responsive to identifying a failure of the first storage controller, assign ownership of the first storage device from the first storage controller to the second storage controller for failover operation of the first storage device;
responsive to identifying a disaster of the second storage site:
assign ownership of the third storage device from the third storage controller to the second storage controller for switchover operation of the third storage device; and
assign ownership of the fourth storage device from the fourth storage controller to the second storage controller for switchover operation of the fourth storage device; and
responsive to identifying restoration of the first storage controller:
perform automated load balancing between the first storage controller and the second storage controller at the first storage site.

20. The non-transitory computer readable medium of claim 19, the performing automated load balancing comprising:
evaluate an original storage site owner property of the third storage device; and
responsive to determining that an original storage site owner property of the third storage device is set to the first storage controller:
assign ownership of the third storage device from the second storage controller to the first storage controller; and
invoke the first storage controller to provide switchover data access for the third storage device.

* * * * *